Figure 1:
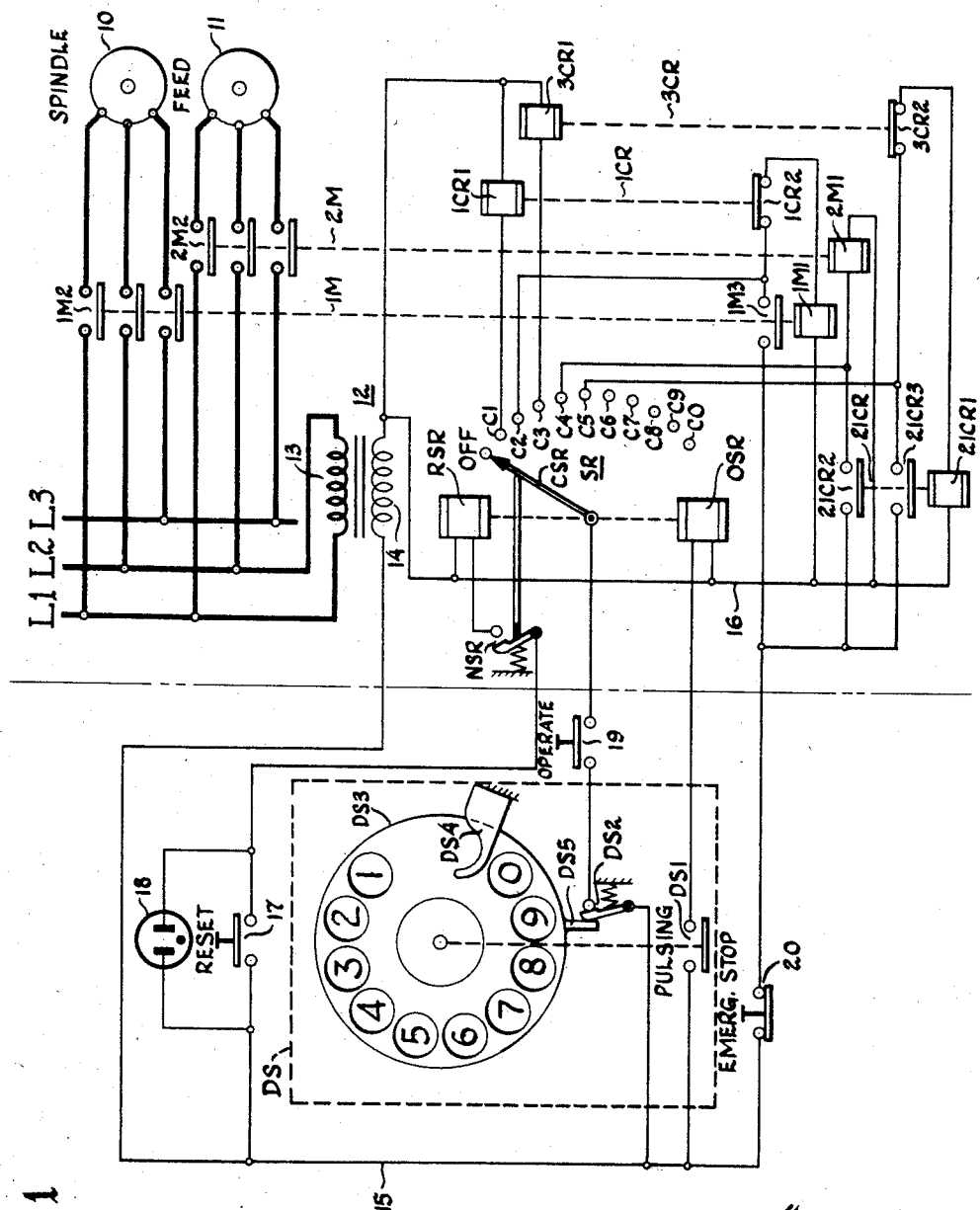

April 21, 1959

R. N. ECK 2,883,597

DIAL SELECTOR SWITCHING SYSTEM FOR PLURAL MOTOR CONTROL

Filed June 15, 1955

2 Sheets-Sheet 1

Inventor
Robert N. Eck
By H R Ratter
Attorney

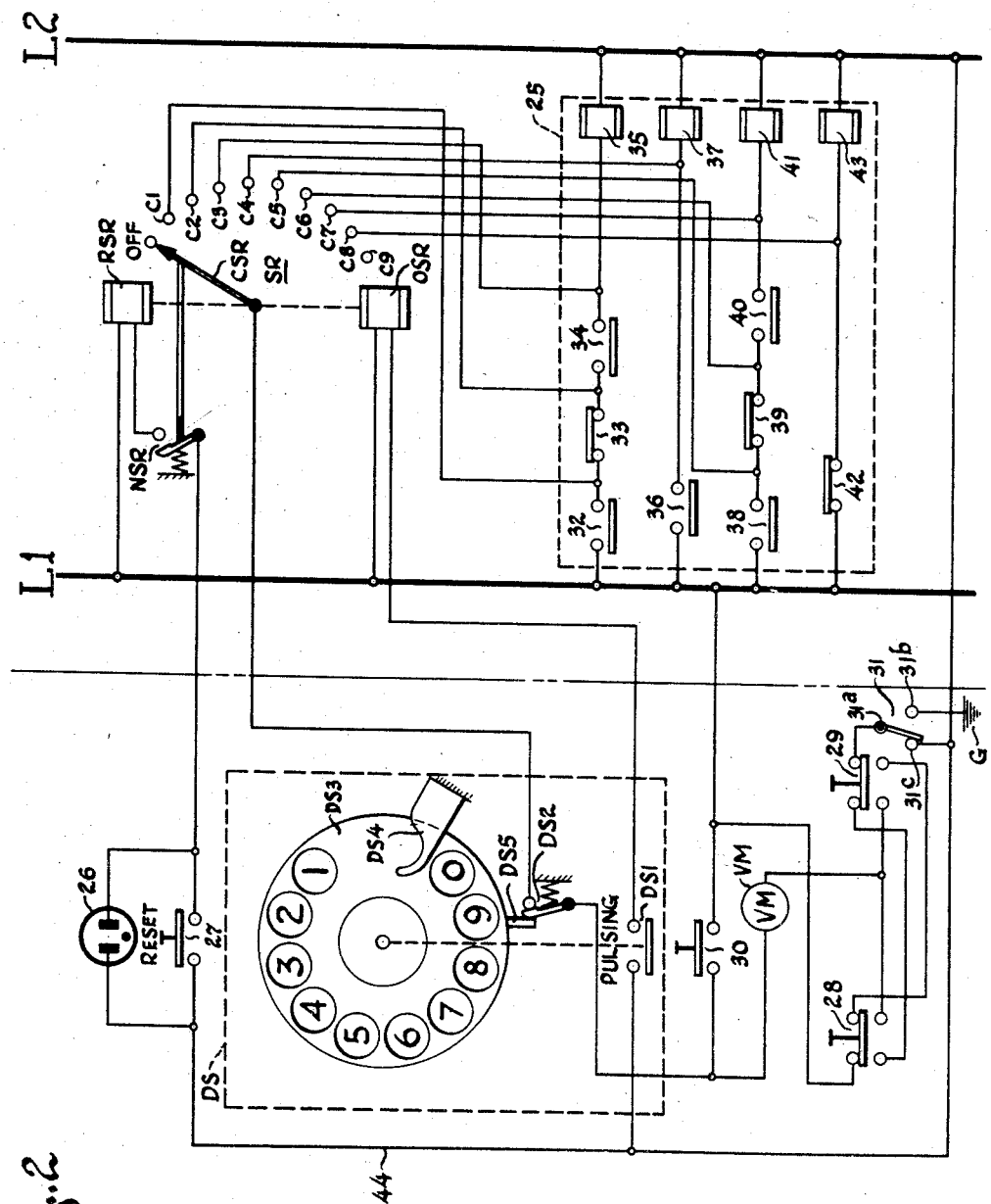

United States Patent Office 2,883,597
Patented Apr. 21, 1959

2,883,597

DIAL SELECTOR SWITCHING SYSTEM FOR PLURAL MOTOR CONTROL

Robert N. Eck, Whitefish Bay, Wis., assignor to Cutler-Hammer, Inc., Milwaukee, Wis., a corporation of Delaware Application June 15, 1955, Serial No. 515,594

5 Claims. (Cl. 318—103)

This invention relates to dial selector switching systems for connecting an operator control station to any one of a plurality of circuits.

A primary object of the invention is to provide improved forms of dial selector switching systems for connecting an operator control station to any one of a plurality of circuits that are remotely located from the control station whereby the number of circuit completing and interrupting instrumentalities in the control station and wiring connecting the latter and the remote circuits can be greatly reduced.

Another more particular object is to provide a system of the aforementioned type particularly suited for control of machine tools having a plurality of electrically operated functions, and A still further particular object is to provide a system of the aforementioned type that is particularly suited to selectively connect a circuit continuity testing control station to any one of a plurality of selected points in an electrical network.

The accompanying drawings disclose certain preferred embodiments of the invention which will now be described in detail, it being understood that these embodiments are susceptible of modification in respect of details without departing from the scope of the appended claims.

In the drawings:

Figure 1 is a diagrammatic showing of a control system incorporating the invention as applied to a machine tool, and Fig. 2 is a diagrammatic showing of a modified control system incorporating the invention applied to a circuit continuity test or for remotely located circuits.

In Fig. 1, the portion of the control system shown to the left of the broken vertical line in the drawing may be assumed to be incorporated in a single housing which constitutes the operator's portable controller, and the portion of the control system in the drawing to the right of such line may be assumed to be housed on the frame of the machine tool, or in a separate cabinet as desired. The motor 10 may be assumed to drive the spindle carrying a cutting tool or the like, and the motor 11 may be assumed to drive a feed adjusting mechanism for moving a work piece in relation to such tool. These motors are typical of motors which are incorporated in many different kinds of machine tools.

Motor 10 may be energized by completion of power connections to lines L1, L2 and L3 of a three phase A.C. supply source through closure of the contactors 1M3 of an electromagnetic contactor 1M which has an electroresponsive winding 1M1 and normally open auxiliary contacts 1M2. Similarly, motor 11 may be energized by completion of its power connection to line L1, L2 and L3 by closure of the contactors 2M2 of an electromagnetic contactor 2M which has an operating winding 2M1.

A transformer 12 having a primary winding 13 connected across lines L1 and L2 of the A.C. source, and having a secondary winding 14, constitute a source of electrical power for the control system. At its left hand end winding 14 is connected to a supply lead 15, and at its right end is connected to a supply lead 16, and additionally, to corresponding ends of operating windings 1CR1 and 3CR1 of electromagnetic relays 1CR and 3CR. The other ends of windings 1CR1 and 2CR1 are connected to contacts C1 and C3 of an electromagnetically operated stepping relay, generally designated SR, relay SR also has an operating winding OSR, a reset winding RSR, a rotary contactor CSR, a spring biased normally closed contact NSR, and ten stationary contacts C1 through C9 and C0, which are spaced apart on an arc at equal rotary angles and which are adapted to be engaged by contactor CSR. Winding OSR is connected at one end to lead 16 and is connected at its other end to contacts DS1 of a dial type pulsing switch DS. Reset winding RSR is connected at one end to lead 16 and at its other end to contact NSR.

Contacts DS1 are also connected to lead 15, and contacts NSR are connected in series with a normally open push button switch 17 to lead 15, and also in series with a neon indicating lamp 18, that is in parallel with switch 17, to lead 15. Contactor CSR is connected in series with a normally open push button switch 19, and spring biased, normally open contacts DS2 of switch DS to lead 15.

Switch DS, which may be assumed to be similar to the dial pulsing switches used on the handsets of automatic telephones, is also provided with a digital operator's dial DS3, a digit stop DS4 and a member DS5 secured to dial DS3. Dial DS3 may be assumed to be normally biased to a rotary counterclockwise extreme limit, and rotatable in the clockwise direction to various positions corresponding to the ten digital openings in the dial face. Upon release of the dial to rotate under its bias in the counterclockwise direction, it may be assumed that the contacts DS1 will close and reopen once for each digit space the dial was rotated in the clockwise direction before its release. For example, if the operator's digit is placed in the opening over "2" and the dial rotated clockwise until the digit strikes the stop DS4 and then released, the contacts DS1 will close two times and reopen two times by the time dial DS3 returns to its counterclockwise limit. It will be noted that contacts DS2 open under their spring bias whenever dial DS3 is rotated out of its counterclockwise limit and are closed by element DS5 whenever the dial rotates back to such limit.

A normally closed emergency stop switch 20 is connected at its left-hand contact to lead 15 and is connected at its right-hand contact to normally open contacts 1M3 of contactor 1M, contacts 21CR2 and 21CR3 of an electromagnetic relay 21CR which has an operating winding 21CR1. Contacts 1M3 of contactor 1M are connected in series with normally closed contacts 1CR2 of relay 1CR and its associated operating winding 1M1 to lead 16. Contacts 21CR2 are connected in series with operating winding 2M1 of contactor 2M to lead 16, and contacts 21CR3 are connected in series with normally closed contacts 3CR2 of relay 3CR and its associated operating coil 21CR1 to lead 16.

Contact C2 of stepping switch SR is connected to the point common between contacts 1M3 and 1CR2 of contactor 1M and relay 1CR respectively. Contact C4 is connected to the point common between contacts 21CR2 and operating winding 2M1 of relay 21CR and contactor 2M, respectively. Contact C5 is connected to the point common between contacts 21CR3 and contacts 3CR2 of relays 21CR and 3CR, respectively.

As will be understood, stepping relay SR is operated by pulses of current fed through operating winding OSR to rotate contactor CSR in steps from its 'off" counterclockwise extreme position to advance and engage the contacts C1, C2, etc. For each pulse, contactor CSR will advance one contact position. Thus, if contactor CSR is initially in the "off" position and contacts DS1 close five times in succession, five current pulses will pass through winding OSR to cause contactor CSR to advance step-by-step in the clockwise direction to finally engage with contact C5. Whenever contactor CSR is out of its "off" position, contacts NSR close to complete circuit for the neon lamp 18 which lights up to indicate that the stepping relay is in some operating position. It may be assumed that the impedance of lamp 18 and reset winding RSR are such that the current flow will be sufficient to cause lamp 18 to glow, but insufficient to develop in coil RSR the ampere turns necessary to cause contactor CSR to be reset back to its "off" position. However, closure of reset switch 17 effectively decreases the circuit impedance to such extent that coil RSR will develop the ampere turns required to reset contactor CSR to its "off" position.

Let it be assumed that the operator desires to energize spindle motor 10. He would dial "2" on DS3 and release. Consequently, relay SR in response to the two closings and opening of contacts DS1 would step contactor to contact C2. Up to this point no circuits would be completed through to motor 10. However, after the dial has returned to its counterclockwise limit and contacts DS2 have been closed, the operator can then complete the energizing connections to motor 10 by momentary closure of push-button switch 19. Closure of switch 19 completes a circuit from lead 15 through switches DS2 and 19, contactor CSR, contact C2, contacts 1CR2 of relay 1CR and operating winding 1M1 of contactor 1M to lead 16. Consequently, the contacts 1M2 close to connect motor 10 to lines L1, L2 and L3, and auxiliary contacts 1M3 close to provide a maintaining circuit for winding 1M1 from lead 15 through switch 20, contacts 1M3 and 1CR2 and winding 1M1 to lead 16.

If it is desired to stop motor 10, reset button 17 would be first closed causing contactor CSR to be returned to "off" position. Then dial DS3 would be operated to bring contactor CSR into engagement with contact C1. Thereafter switch 19 would be operated to complete a circuit through winding 1CR1 of relay 1CR to cause contacts 1CR2 to open. Opening of contacts 1CR2 results in deenergization of winding 1M1 and the consequent opening of contacts 1M2 to interrupt the power connection to motor 10, and in the opening of winding contacts 1M3 to interrupt the maintaining circuit for winding 1M1.

Suppose it is desired to operate motor 11. Then, either following reset of relay SR to "off" position, or without first effecting such resetting, if dial DS3 is appropriately operated to effect stepping of contactor CSR to contact C4, contacts 2M2 can be closed to complete the power connection for motor 11 each time switch 19 is thereafter closed. It will be observed that closure of switch 19 will complete an energizing circuit from lead 15 through switch DS2, switch 19, contactor CSR, contact C4 and operating winding 2M1 of contactor 2M to lead 16. Contactor 2M will of course only remain energized so long as switch 19 is maintained closed. Thus motor 11 can be "jog" operated in accordance with the time interval that the switch 19 is maintained closed by the operator.

If instead it is desired to operate motor 11 continuously, then dial DS3 would be appropriately operated to effect stepping of contactor CSR to contact C5. Thus when switch 19 is thereafter closed, a circuit will be completed from line 15, through switch DS2, switch 19, contactor CSR, contact C5, the then closed contacts 3CR2 of relay 3CR, winding 21CR1 of relay 21CR to lead 16. Winding 21CR1 is thereupon energized to close its contacts 21CR2 and 21CR3 and thereby completing an energizing connection for winding 2M1 from lead 15 through emergency stop switch 20, contacts 21CR2 and winding 2M1 to lead 16 to energize motor 11. The closure of contacts 21CR3 provides a maintaining circuit for coil 21CR1 when switch 19 is released.

Normal stopping of motor 11 would be effected by resetting relay SR to "off" position and then operating dial DS3 to effect operation of relay SR to engage contactor CSR with contact C3. The operation of switch 19 will complete an energizing circuit from lead 15 through switch DS2, switch 19, contactor CSR, contact C3, winding 3CR1 to winding 14 to energize winding 3CR1 and thereby open its associated contacts 3CR2 to deenergize winding 21CR1. Deenergization of winding 21CR1 of course effects opening of contacts 21CR2 and 21CR3, and the opening of the former deenergized winding 2M1 to open contact 2M2.

It will be seen that when either of the aforementioned continuous run connections for motors 10 and 11 have been established that their motors can alternatively be stopped by opening emergency stop switch 20 without requiring reset of relay SR.

It will be appreciated that motors 10 and 11, and their associated controlling contactor and relays 1M, 2M, 1CR, 3CR and 21CR are merely exemplary of motors and how their starting and stopping can be selected and effected through the medium of the present control system. Other arrangements are possible and are not limited by the specific examples herein shown.

Fig. 2 discloses one preferred form of a voltage and continuity test apparatus for an electrical network, such as for example that shown within the broken line rectangle 25. The test apparatus comprises a dial pulsing switch DS and associated indicating light 26 and reset switch 27, a voltmeter VM, two-way switches 28 and 29, a single pole switch 30 and a two-way selector switch 31. As depicted network 25 comprises a number of parallel circuit branches connected across electrical supply lines L1 and L2. One such circuit comprises normally open contacts 32, normally closed contacts 33, normally open contacts 34 and an electromagnetic coil 35 connected in series. A second branch comprises normally open contacts 36 connected in series with an electromagnetic coil 37. A third branch comprises normally open contacts 38, normally closed contacts 39, normally open contacts 40 connected in series with an electromagnetic coil 41, and the fourth circuit comprises normally closed contact 42 connected in series with an electromagnetic coil 43. Contact C1 of stepping relay SR is connected to the point common between contacts 32 and 33, contact C2 is connected to the point common between contacts 33 and 34 and contact C3 is connected to the point common between contacts 34 and coil 35, and contact C4 is connected to the point common between contacts 36 and coil 37. Contact C5 is connected to the point common between contacts 38 and 39, contact C6 is connected to the point common between contacts 39 and 40, and contact C7 is connected to the point common between contacts 40 and coil 41. Contact C8 is connected to the point common between contacts 42 and coil 43.

A conductor 44, which is connected at one end to line L2 is connected in series with switch 27, contacts NSR and coil RSR of relay SR to line L1. Neon light 26, which functions like light 18 of Fig. 1, is connected in parallel with switch 27. Pulsing contacts DS1 are connected at one side to conductor 44, and at the other side in series with operating winding OSR to line L1. Contactor CSR of relay SR is connected in series with contacts DS2 and voltmeter VM to the point common between the lowermost pairs of contacts of the two-way switches 28 and 29. Switch 30 is connected between line L1 and the point common between contacts DS2 and voltmeter VM. The upper set of contacts of switch 28 are connected to line L1 and to the right-hand one of the lower set of contacts of switch 29. The upper set of contacts of switch 29 are connected to the contactor 31ᵃ of selector switch 31 and to the left-hand of the lower set of contacts of switch 28. Stationary contact 31ᶜ of switch 31 is connected to conductor 44 and contact 31ᵇ is connected to ground indicated at G.

Let it be assumed that it is desired to test the voltage of the point between contacts 32 and 33 with respect to either line L1, L2 or ground G. Then dial switch DS would be operated as aforedescribed in connection with Fig. 1 to cause relay SR to operate and bring contactor CSR in engagement with contact C2. Thereafter, when switch 29 is operated to close its lowermost contacts, circuit will be completed for voltmeter VM from line L1, the upper set of contacts of switch 28, the lower set of contacts of switch 29 through voltmeter VM, contacts DS2, contactor CSR and contact C2 to the point common between contacts 33 and 34. With switch 28 closed to its lower set of contacts, switch 29 in the operating position shown, and switch 31 closed to contact 31ᶜ, voltmeter VM would be connected between line L2 and the point of the network 25 determined by the positioning of relay SR. Alternatively with switch 31 closed to contact 31ᵇ voltmeter VM would be connected to ground with the same last mentioned operating conditions of switches 28 and 29. As will be appreciated by those skilled in the art voltages must be taken from a number of different points in the network to determine the operating state or continuity through a circuit branch. It will be seen that one can go from a point connected to a lower numbered contact of relay SR by dialing the number that is numerical difference between such contacts, but before one can go to a point in the network connected to a lower numbered contact from a point connected to a higher numbered contact, relay SR must first be reset by operation of switch 27 which completes circuit for reset coil RSR to return contactor CSR to "off" position.

Closure of switch 30, with concurrent closure of switch 28 to its lower contacts, and closure of switch 31 to contact 31ᶜ, affords connection of voltmeter VM directly across lines L1 and L2, thereby by-passing connections through relay SR. This permits quick determination as to whether lines L1 and L2 are alive, and if so, whether or not the voltage thereafter is up to rated value without need for operating or going through stepping relay SR. Also assuming appropriate positioning of stepping relay SR, closure of switch 30 (without the aforementioned operation of switch 28) affords direct connection of the selected point in network 25 to line L1, thereby by-passing all other elements in the circuit branch and line L1. For example, the latter type of operation would be useful to test the operation of relays and contactors that may be operated by the electromagnetic coils 35, 37, 41 and 43.

Any other preferred type of circuit continuity indicating device, such as an indicating lamp may be substituted for voltmeter VM if desired.

I claim:

1. In combination, a source of electrical power, a network in circuit with said source, a stepping relay comprising at least two spaced apart contacts, a cooperating rotary contactor, means energizable to rotate said contactor in steps, one for each pulse of energy supplied thereto and means energizable to reset said contactor, a dial type pulsing switch operable to supply the contactor rotating means with energizing pulses in accordance with the dialing thereof, said relay in any step completing a circuit therethrough to a point on said network, circuit continuity indicating means, switch means operable selectively to complete individual series circuits from either side of said source or from ground through said indicating means to said relay, and a switch operable to effect energizing connections from the contactor reset means to said source.

2. In combination, at least two electric motors, a source of electrical power, means individualized to said motors which are operable to connect their associated motors to said source for energization, a stepping relay comprising at least two spaced apart contacts, a cooperating rotary contactor, means energizable to rotate said contactor in steps one for each pulse of energy supplied thereto, means energizable to reset said contactor, a dial type pulsing switch operable to supply the contactor rotating means with energizing pulses in acordance with the dialing thereof, said relay in certain steps completing a circuit through said relay and through one of the first mentioned means to one side of said source, a second switch operable to complete a circuit from another side of said source to said relay, and a third switch operable to effect energizing connections from the contactor reset means to said source.

3. The combination according to claim 2 wherein the first mentioned means includes electromagnetic contactors which are selectively connected in circuit with said second switch in accordance with the effective operating step of said relay.

4. The combination acording to claim 3 wherein said contactor rotating means and reset means are electromagnetic.

5. The combination with a machine tool having at least two electric motors for effecting different motions thereof, of a source of electrical power, electro-responsive means individualized to said motors operable to connect their associated motor to said source for energization, a stepping relay comprising at least two spaced apart contacts each of which is in circuit with a respective one of said means, a cooperating rotary contactor, means energizable to rotate said contactor in steps one for each pulse of energy supplied thereto and means energizable to reset said contactor, and a control station comprising a dial type pulsing switch in circuit with the contactor rotating means and said source and operable to supply the latter with energizing pulses in accordance with the dialing thereof, a second switch operable to complete a circuit from one side of said source through said contactor to the contact engaged thereby and a third switch operable to connect said contactor resetting means across said source for energization.

References Cited in the file of this patent

UNITED STATES PATENTS

| | | |
|---|---|---|
| 1,512,584 | Dunham | Oct. 21, 1924 |
| 2,417,376 | Newman | Mar. 11, 1947 |
| 2,496,446 | Dean | Feb. 7, 1950 |
| 2,727,570 | Hempel | Dec. 20, 1955 |